United States Patent Office 3,667,797
Patented June 6, 1972

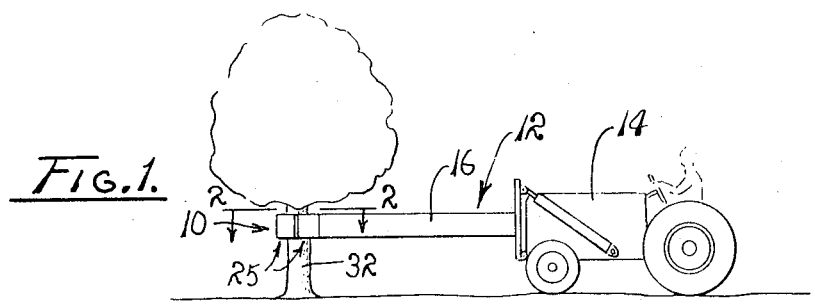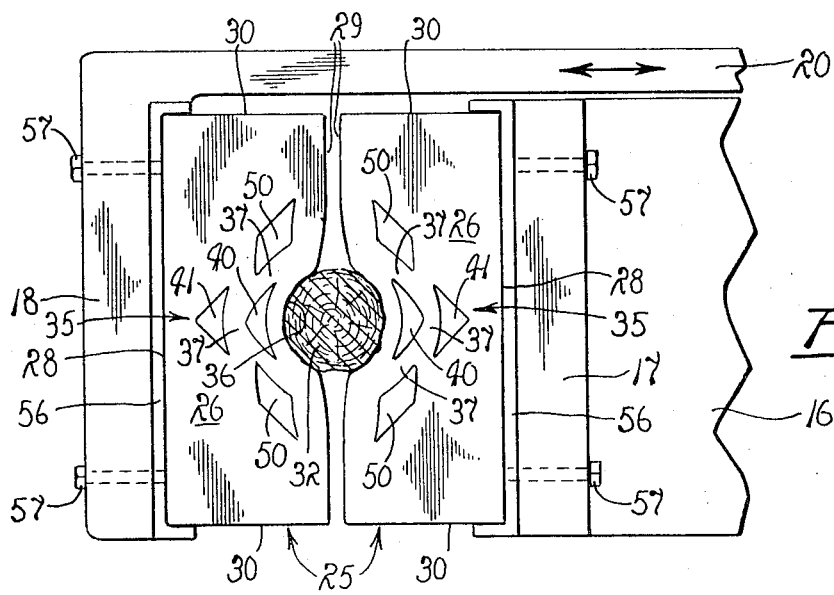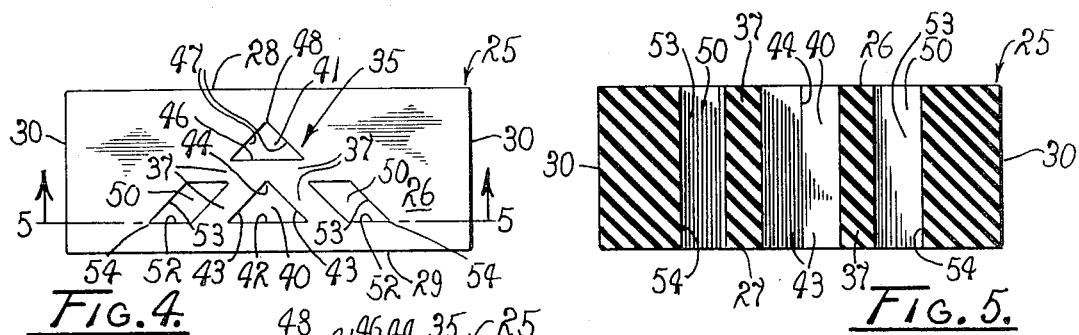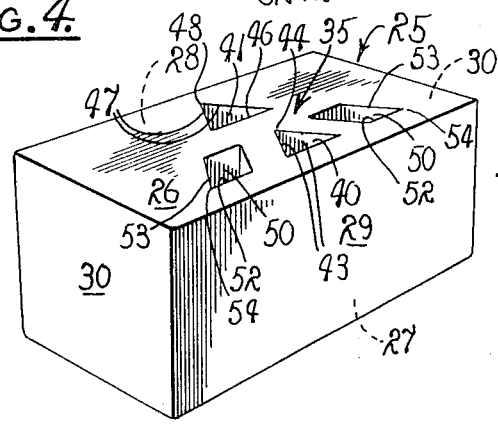

3,667,797
CUSHIONING DEVICE
Edward D. Kilby, Rte. 2, Box 413,
Gridley, Calif. 95948
Filed Jan. 13, 1971, Ser. No. 106,057
Int. Cl. B25b 11/00
U.S. Cl. 294—103 R     12 Claims

ABSTRACT OF THE DISCLOSURE

A cushioning device for the clamping jaws of a tree shaker or the like providing a substantially solid, relatively hard pad of somewhat compressible material adapted to be mounted on the jaws having an outwardly disposed tree gripping surface and means within the pad inwardly spaced from the gripping surface providing a readily compressible pocket to permit limited inward deformation of the gripping surface of the pad in intimately conforming, tightly gripping relation to a tree trunk or limb with only a minimum of jaw clamping pressure while transmitting substantially the entire shaking force from the shaker to the tree.

BACKGROUND OF THE INVENTION

Many fruit crops are presently harvested by mechanically shaking the trees with the fruit dropping therefrom onto suitable catching devices disposed beneath the trees. Rising labor costs have steadily increased the demands for mechanical shakers although they have long been recognized as presenting certain problems. Mechanical shakers employed for this purpose usually provide a mobile chassis mounting an elongated boom or shaker arm having a pair of tree engaging jaws disposed on the outer end thereof. The jaws are disposable in tightly clamping relation about the trunk or selected limbs of the trees and the boom arm violently reciprocated through a compound oscillatory motion which is transmitted through the jaws to the tree. Cushioning pads of various types have been used in attempts to minimize damage to the bark of the trees by the clamping jaws. Even with such pads, the irregular surfaces of the trunk and limbs are difficult to hold between the jaws during the entire shaking cycle. Some of the commercially available pads are constructed of a material which is too stiff and do not have sufficient resiliency dependably to be maintained in tightly gripping relation to the limb or trunk. During the shaking cycle, slippage thus occurs between the pads and the bark, causing the bark to be crushed or broken and skinned from the trunk or limbs of the trees. Other commercially available pads do not have sufficient rigidity properly to transmit a sufficient shaking force from the shaker to the trees during the shaking cycle to assure complete havesting of the fruit.

SUMMARY OF THE INVENTION

Accordingly, it is an object of the present invention to provide an improved cushioning device for the clamping jaws of tree shakers and the like.

Another object is to provide such an improved cushioning device which is effective firmly to grasp and to hold the trunks and limbs of a tree throughout the entire shaking cycle.

Another object is to provide an improved cushioning device of the character described which is effective firmly to grasp and to hold the tree during the shaking cycle with a minimum of jaw clamping pressure to attain dependable operation.

Another object is to provide an improved cushioning device which substantially eliminates slippage between the clamping jaws and the trees so as to eliminate the usual crushing and skinning of bark from the trees, as experienced with conventional shakers.

Another object is to provide an improved cushioning device which is effective to transmit substantially the entire shaking force from the shaker to the trees.

Another object is to provide an improved cushioning device which utilizes a pad providing a readily compressible tree engaging pocket and a substantially incompressible rigid backing for the pocket firmly but gently to grasp and to hold the tree for optimum transmission of the shaking forces from the shaker to the tree with no appreciable damage thereto.

Other objects and advantages of the present invention will subsequently become more clearly apparent upon reference to the following description and accompaning drawing.

BRIEF DESCRIPTION OF THE DRAWING

FIG. 1 is a side elevation of a cushioning device embodying the principles of the present invention shown mounted on the clamping jaws of a tree shaker disposed in operating position with respect to a tree and borne by a tractor.

FIG. 2 is a somewhat enlarged fragmentary top plan view of the cushioning device and transverse horizontal section through the tree, taken on line 2—2 of FIG. 1.

FIG. 3 is a perspective of one of the pads of the cushioning device of the present invention removed from the clamping jaw of the shaker.

FIG. 4 is a top plan view of the pad of FIG. 3.

FIG. 5 is a substantially vertical section through the pad, taken on line 5—5 of FIG. 4.

DESCRIPTION OF THE INVENTION

Referring more particularly to the drawing, a cushioning device embodying the principles of the present invention is generally indicated by the reference numeral 10 for use with a tree shaking machine 12. The tree shaking machine is mounted on a mobile chassis or other prime mover such as the tractor indicated by the reference numeral 14. The tractor mounts an elongated boom arm 16 which is adapted to be vigorously reciprocated and oscillated by a suitable mechanism, not shown. A stationary tree clamping jaw 17 is operationally associated with an outwardly extended movable tree clamping jaw 18. The movable jaw has an elongated actuating arm 20 connected to a suitable power shifting mechanism, not shown, such as a hydraulic jack or the like, adjustably to position the movable jaw 18 toward and from the stationary jaw 17.

The cushioning device 10 provides an elongated rectangular pad of substantially solid relatively hard somewhat compressible material such as hard rubber or the like which has opposite predetermined upper and lower surfaces 26 and 27, respectively, opposite predetermined inner and outer side surfaces 28 and 29, respectively, and opposite ends 30. The outer side surface 29 of the pad 25 provides a relatively smooth, flat tree gripping surface of substantial area to distribute the clamping pressure imposed by the jaws over the bark on the trunk or selected limbs of the tree generally indicated by the reference numeral 32 in FIG. 1.

In order to permit limited deformation of the outer tree gripping surface 29 of the pad 25, a predetermined arrangement of a plurality of elongated apertures, generally indicated by the reference numeral 35, is formed through the pad extended between its upper and lower surfaces 26 and 27 substantially intermediate the ends 30 thereof. The apertures are individually formed and arranged to provide a readily compressible tree receiving pocket 36 upon engagement of the central portion of the outer tree gripping side surface 29 with the tree. The spaced apertures define a substantially triangular lattice formation having a plurality of web members 37 forming the partitions between the apertures. The lattice formation consists of a pair of equilateral, right triangular, prismatic openings 40 and 41 which are disposed in aligned relation transversely of the longitudinal axis of the pad substantially intermediate the ends 30 thereof. The opening 40 has a side 42 disposed in closely spaced, substantially parallel relation to the outer tree engaging side surface 29 of the pad and a pair of opposite sides 43 terminating in an inwardly disposed apex 44. The opening 41 has a side 46 in adjacently spaced relation to the apex 44 of the opening 40 and in substantially parallel relation to the side 42 of the opening 40 and the outer tree gripping side surface 29 of the pad. The opening 41 further includes opposite sides 47 converging to an apex 48 adjacent to the inner side surface 28 of the pad.

The lattice formation 35 in the pad 25 further includes a pair of right rhomboid, prismatic openings 50 individually disposed in adjacently spaced relation to the opposite sides 43 of the opening 40. Each of the openings 50 has a side 52 in spaced substantially parallel relation to the outer tree gripping side surface 29 of the pad and in substantial alignment with the side 42 of the triangular opening 40. Such aligned sides of the described openings form the base of the generally triangular lattice formation 35 with the apex 48 of the triangular opening 41 defining the apex thereof. In order to maintain substantial uniformity of the partitions or web sections 37 between the openings, the opening 41 is placed in the general triangular arrangement so that its opposite sides 47 are substantially aligned with the longitudinal axis of their respectively adjacent rhomboid openings 50. The openings 50 individually include outer sides 53 which combine with the base sides 52 to form base corners 54 for the triangular arrangement of apertures. It will be observed that the openings 40, 41 are all approximately parallel to the trunk or limb of the tree being grasped.

For simplicity and convenience of description, a mounting plate 56 is shown bonded to the inner surface 28 of the pad 25 for attaching it to either of the jaws 17 or 18 of the shaker 12. Preferably, a pad is mounted on each of the jaws by a plurality of bolts 57 extended through the jaws and screw-threadably received in the plates. In actual practice, however, the pads are held by any means suitable to the purpose.

OPERATION

The operation of the described embodiment of the subject invention is believed to be readily apparent and is briefly summarized at this point. The shaker 12 is positioned with respect to the trunk of the tree 32 with the jaws 17 and 18 disposed in widely spaced relation in order that the trunk or limb can be easily received in optimum centered relation between the pads 25 on the jaws. When properly aligned, the movable jaw 18 is actuated for movement toward the stationary jaw 17 upon appropriate manipulation of the shaker controls, not shown, to force the pads in tightly clamping relation around the trunk of the tree.

Upon initial contact of the outer gripping side surface 29 of each pad, the lattice formation of apertures 35 permits the central portion of the outer side surface readily to deform and collapse inwardly in precisely conforming wrapping relation about the adjacent periphery of the trunk so as to accommodate any irregularities in the surface bark thereof. It will be apparent from an inspection of FIG. 2 that the webbed interstices 37 between the apertures are readily deformable in substantially closing relation to such apertures in order to form the tree receiving pocket 36 in the outer side surface 29 of the pad. The inherent resiliency of the material of the pad and particularly the deformed webbed interstices provide a reactive force to maintain the outer surface 29 in tightly gripping relation about the adjacent periphery of the trunk of the tree and dependably to maintain such tenacious hold on the trunk throughout the entire vigorous shaking operation. The solid ends 30 of the pad provide a substantially rigid backing for the centrally disposed pocket forming lattice formation 35 which substantially precludes any relative movement between the pad and the bark of the trunk of the tree. The solid ends of the pad further assure substantially complete transmission of all the shaking forces generated by the shaker through the pad to the trunk of the tree.

As best shown in FIG. 2, the pads 25 on the stationary jaw 17 and the movable jaw 18 are disposed in nearly touching relation substantially completely to circumscribe the trunk of the tree 36 to provide a maximum of surface contact substantially to eliminate any possibility of slippage therebetween. This, of course, varies depending upon the diameter of the trunk but the pads are usually provided in a size corresponding to the trunk size of the trees to be harvested which are generally approximately uniform throughout an orchard. It should be further noted that in view of the relatively wide base of the lattice formation of apertures 35 that the pad need not be precisely centered with respect to the trunk of the tree. It has been found that the pad of the present invention is substantially effective even when the trunk is aligned with one of the rhomboid openings 50 which merely shifts the tree receiving pocket from its optimum centered relation longitudinally of the pad. For smaller limbs, such positioning is even more desirable than the centered condition shown in FIG. 2 in order to provide sufficient rigidity efficiently to transmit all the shaking forces from the shaker to the limb which might not be obtainable if the relatively small limb were centered with respect to the pad.

In view of the foregoing, it is readily apparent that the structure of the present invention provides an improved cushioning device for mounting on the clamping jaws of tree shakers and the like which is effective more firmly to grasp and to hold the trunk or limb of a tree and which requires only a minimum of clamping pressure thereagainst during the shaking operation. The substantially solid ends of the pads provide a rigid backing for the readily collapsible tree engaging pocket which intimately conforms to the surface of the tree in substantially completely wrapping relation substantially to eliminate any tendency for slippage therebetween and damage to the surface of the tree.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A cushioning device, for the clamping jaws of a tree shaker or the like, comprising a substantially solid relatively hard pad of somewhat compressible material adapted to be mounted on such a jaw having an elongated body providing opposite ends, a longitudinal axis, and an outwardly disposed tree gripping surface, said pad having lattice means inwardly spaced from said gripping surface providing readily compressible pocket means to permit limited inward deformation of said gripping surface of the pad in intimately conforming tightly gripping relation to a tree with only a minimum of jaw clamping pressure while transmitting substantially the entire shaking force from the shaker to the tree, said pocket means including at least one elongated aperture extending through the pad intermediate its ends substantially transversely of said longitudinal axis.

2. The cushioning device of claim 1 in which said pad is substantially rectangular and provides predetermined opposite upper and lower surfaces, and opposite inner and outer side surfaces; means mounting said pad with its inner surface against a jaw of such a tree shaker, and said aperture extending between said upper and lower side surfaces of the pad.

3. The cushioning device of claim 2 in which said lattice means comprises a plurality of said apertures through the pad in predetermined spaced arrangement with a plurality of readily deformable web segments in the pad between said apertures.

4. The cushioning device of claim 3 in which said apertures are arranged in a generally triangular relationship to form said compressible pocket in the pad.

5. The cushioning device of claim 4 in which said apertures are of multi-sided configuration having inner sides defining said web segments and opposite sides with each aperture having at least one opposite side substantially aligned with the opposite side of an adjacent aperture to form said generally triangular compressible pocket in the pad.

6. The cushioning device of claim 5 in which said generally triangular compressible pocket has a base portion disposed in spaced substantially parallel relation to said outer side surface of the pad, and an apex portion disposed adjacent to said inner side surface of the pad.

7. The cushioning device of claim 6 in which said generally triangular arrangement of apertures has a pair of spaced centrally disposed apertures of equilateral, right triangular, prismatic configuration with one aperture disposed along said base of said triangular arrangement and the other forming the apex thereof adjacent to said inner side surface of the pad, and a pair of apertures of right rhomboid prismatic configuration individually disposed adjacent to the opposite sides of said one of said equilateral triangular apertures forming opposite base corners for said triangular arrangement of apertures.

8. The cushioning device of claim 7 in which the parallelogram apertures individually provide longitudinal axes, and said opposite sides of said equilateral triangular aperture adjacent to said inner side surface of the pad are substantially individually aligned with the longitudinal axes of said parallelogram apertures.

9. A pad for tree shakers and the like comprising a member of resiliently compressible material having a substantially rectangular object engaging surface, a substantially equilateral, right triangular, prismatic, first opening extended through the member having a base side substantially parallel to said surface and an oppositely disposed apex; a substantially identical, triangular, second opening extended through the member having a base side in substantially parallel spaced relation to the apex of the first opening and centered thereon, an oppositely disposed apex, and opposite sides diverging in the direction of said surface; and a right rhomboid, prismatic opening extended through the member on each side of the first opening, said last named openings having base sides substantially aligned with the base side of the first opening and on opposite sides thereof, opposite sides substantially parallel to a respective side of the second opening and substantially equally spaced on opposite sides from alignment therewith, and fourth sides substantially transversely aligned with the apex of the first opening and on opposite sides thereof.

10. A cushioning device, for the clamping jaws of a tree shaker or the like, comprising an elongated pad of resiliently compressible material having opposite ends and being adapted to be mounted on such a jaw, said pad providing an outwardly disposed tree gripping surface and having elongated pocket means therein intermediate said ends disposed transversely of the pad in inwardly spaced relation to the gripping surface.

11. The device of claim 10 in which the pocket means includes a plurality of apertures extended transversely in the pad in substantially parallel relation to the gripping surface.

12. A cushioning device, for the jaw of a tree shaker or the like adapted to extend transversely of a tree trunk or limb and to be clamped thereto for shaking purposes, comprising a pad of resiliently compressible material having opposite ends; and means adapted to mount the pad on such a jaw in predetermined orientation with respect thereto to extend transversely of such trunks or limbs, the pad having a tree engaging surface and elongated pocket means therein intermediate its ends disposed in substantially parallel spaced relation to the tree engaging surface and transversely of the jaw whereby the pad has reduced resistance to compressibility intermediate its ends and along tree trunks and limbs clamped to the jaw.

References Cited

UNITED STATES PATENTS 3,506,298   4/1970   Martin _____ 294—103 R

EVON C. BLUNK, Primary Examiner

J. D. CHERRY, Assistant Examiner

U.S. Cl. X.R.

56—328 TS